Jan. 30, 1968  O. F. GENZ  3,366,425
BEARING WITH INTEGRAL WIPER OR SCRAPER
Filed Oct. 4, 1963  2 Sheets-Sheet 1

INVENTOR.
ORVILLE F. GENZ
BY John P. Murphy
ATTORNEY

Jan. 30, 1968    O. F. GENZ    3,366,425
BEARING WITH INTEGRAL WIPER OR SCRAPER
Filed Oct. 4, 1963    2 Sheets-Sheet 2

INVENTOR.
ORVILLE F. GENZ
BY John P. Murphy
ATTORNEY

United States Patent Office 3,366,425
Patented Jan. 30, 1968

3,366,425
BEARING WITH INTEGRAL WIPER OR SCRAPER
Orville Ferdnand Genz, Elmwood Park, Ill., assignor to Garlock Inc., Palmyra, N.Y., a corporation of New York
Continuation-in-part of application Ser. No. 84,061, Jan. 23, 1961. This application Oct. 4, 1963, Ser. No. 315,119
2 Claims. (Cl. 308—3.5)

This invention relates to bearings and more particularly to a non-metallic bearing structure for all types of operation.

This application is a continuation-in-part of application Ser. No. 84,061, filed Jan. 23, 1961, now abandoned by Orville Ferdnand Genz, for Piston Rod Bearing.

In devices such as a journal or rod bearing for a rotating, oscillating or reciprocating mechanism wherein a load may bear laterally or longitudinally on a rod or shaft, the forces of leverage and the like urge the rod against the conventional bearing, which quickly wears and fails to maintain the rod in proper relationship with the device. Another deleterious effect of rapid wear of the bearing is that the function of any sealing device associated therewith is deteriorated due to the improper association of the bearing and rod with the main device. Moreover, any dirt or other foreign matter which may accumulate on the rod may be carried into the bearing area to ultimately cause scoring, galling and generally accelerated bearing wear.

Additionally, many fluid pressure operated cylinders such as are used in back-hoes, bucket and boom, steering devices, shock absorbers, holding cylinders and the like on bulldozers, load transfer mechanisms, farm and industrial tractors, etc., generally comprise a hollow cylinder in which is disposed a piston mounted for reciprocation or the like on a piston rod. The rod is disposed through at least one end of the cylinder body for attachment to a mechanism being operated thereby. Cylinders may be provided conventionally with a gland structure in the end member wherein the most simple combination is a packing and a gland for retaining the packing. More complex structures may include combinations of seal rings, rod bearings, follower, scraper or wiping means, and an end cap.

The nature of such combinations is that one member is piloted from another; whereby parts against which the piston rod operates are piloted, or derive functional relative support, from other parts which are separate in the combination. Moreover, these prior art combinations are not homogeneous in that several elements may be formed from several different materials, which further creates many problems in engineering modifications for more than one type of service.

In cases where the rod in any of the above cases may move rapidly with both lateral and longitudinal thrust, the impact loading of the bearing may be severe. Conventional bearings are not adapted for long life in such combinations, and conditions. Moreover, the design of prior art devices precludes any provision for controlling the characteristics and properties of certain sealing and wiping structures without the use of accessory structure.

It is therefore a primary object of this invention to provide bearing means for rotary, oscillating and reciprocating applications adapted for long life under severe loading conditions.

Another main object is to provide wiping and sealing means wherein the physical characteristics and properties may be controlled by design without attendant accessory structure.

Another object is to provide a bearing means adapted to exclude foreign matter from entering the journal or bearing and/or sealing area.

Another object is to provide a bearing means which is operable over an extremely wide range of environmental conditions.

It is also a main object of this invention to provide a bearing structure which may be applied to rotating, oscillating or reciprocating rod or shaft applications for the performance of several integrated functions with the minimum number of parts.

Another object is to provide an integral structure of homogeneous material for several operations.

A further object is to provide integral bearing structure which is adapted to pilot directly from the carrier device.

A further object is to provide renewable integral structure which is adapted to be serviced in the most economical fashion.

In carrying out the objects of this invention there is formed an arrangement of an annular bearing formed of plastic material reinforced with unoriented fibers and having formed as an integral part thereof a lip depending from an end of the bearing body. The invention also contemplates the foregoing structure including an integral depending lip at each end of the body and various configurations of the body for various uses of the bearing.

Further features of the invention will become apparent from the following specifications and drawings, in which.

The basic principle of this invention lies in the formation of a bearing having as an integral part thereof a lip formed to depend from an end of the bearing. The bearing may be formed of a plastic material reinforced with unoriented fibers; and the reinforcement of the material extends throughout all integral portions of the device, thus being a homogeneous material in the device.

Figure 1:
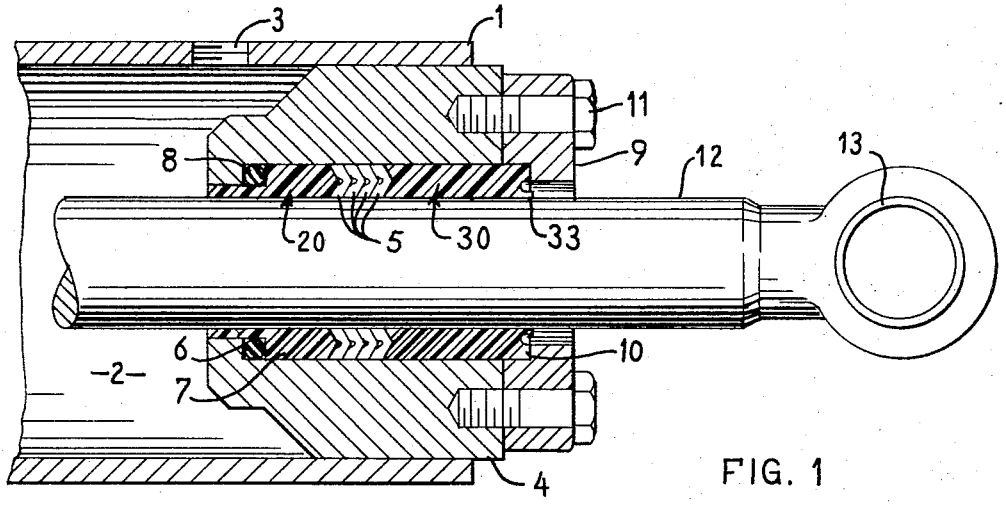
FIG. 1 is a longitudinal sectional view of an end of a fluid operated cylinder, illustrating one embodiment of the invention.
Figure 5:
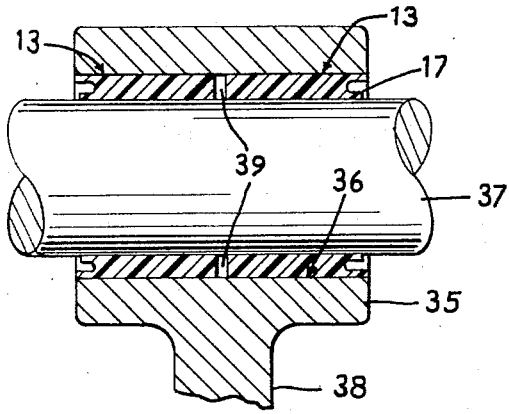
FIG. 5 is a longitudinal sectional view of a bearing housing or journal and pin showing the disposition of another embodiment.

FIG. 1 illustrates the disposition of two preferred types of bearings according to this invention. One type, the clevis bearing or linkage bushing 13 carried by the piston rod or shaft 12 is exemplary of a basic application of this invention. Referring now to FIG. 5, there is shown an enlarged fragmentary sectional view of a bearing housing 35 in which is disposed a preferred embodiment of the bearing 13. The bearing housing 35 may be any device, such as the hub of a conveyor pulley or wheel, the hub of an implement wheel, shaft log for a drive shaft, bearing housing for a push rod or shaft or clevis pin or control linkage; whereby the extended member 38 would be the body portion of the pulley, brace for the shaft log, etc., respectively. The rod or shaft 37 is therefore exemplary of an axle, clevis pin, push rod, drive shaft, control link, or the like. Regardless of whether the housing 35 is stationary and the rod or shaft 37 movable or the housing 35 is movable and the rod 37 fixed; motion of the one relative to the other may be any one or combination of rotating, oscillating or reciprocating motion. Although either the housing or the rod or shaft may be movable, it will hereinafter be assumed for purposes of discussion and simplicity that the rod or shaft is movable.

In view of this, the housing 35 may conventionally define a cylindrical opening 36 therethrough in which is disposed or carried a bearing 13 forming the subject of this invention. As the rod 37 is caused to move relative to the bearing 13, the rod 37 derives stability and support from the bearing 13; and the bearing must necessarily operate efficiently and with long life without failure and especially without accumulating dirt and other foreign matter which would score or otherwise damage the rod 37 or the bearing surface.

Figure 6:
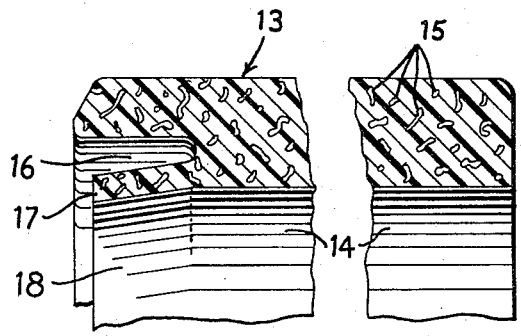
FIG. 6 is an enlarged sectional view of a basic embodiment of the invention as shown in FIG. 5.

Thus the combination of structure and material of the bearing 13 as shown on an enlarged scale in FIG. 6 forms the basis for a superior device having all the necessary characteristics and properties to overcome the objections to the known devices. In FIG. 6 it will be seen that the bearing comprises a cylindrical body formed of a homogeneous plastic material reinforced with unoriented fibers 15. Preferably, the bearing is formed of a nonmetallic material which is a plastic type polymer which may be selected from the group including nylon, Delrin, Teflon and others of either a thermoplastic or thermosetting nature, and has embedded therein, in random or unoriented fashion, glass or other fibers 15. The result of this combination is an exceptional material which is particularly well suited to these applications. Some of the physical properties which result from this combination are: operating temperature range from —65° F. to +350° F.; operable under any climate; exceeds the range of all "hydraulic" pressure fluids; less than 0.1% volume change after cooling from test in oil at 340° F.; low coefficient of thermal expansion, less than $6 \times 10^{-6}$; coefficient of friction very low, enabling dry or hydraulic fluid pressure operation; and impact strength and resistance to deformation under shock and load very high. This is due to the random arrangement of the unoriented fibers 15 throughout the entire structure of the bearing. Under shock and load, the fibers 15 distribute stress energy in all directions throughout the bearing, thus minimizing the effects of stress at any one area. High flexural strength is also achieved. The unoriented fibers 15, which obviously lie in all planes and are pointed in no particular direction do not transmit pressure in any given direction. These fibers do however distribute the slight thermal growth evenly.

The cylindrical body of the bearing 13 defines an axial bearing surface 14 formed therethrough, through which a rod may be disposed. Integral wiping or scraping means in the form of a lip 17 may be formed to depend from an end of the bearing 13. Preferably, the lip 17 will be formed as the result of an annular groove 16 formed in the end of the body, thus defining the annular lip 17. The lip 17 is also formed in the shape of an incomplete truncated cone as at 18. It will therefore be observed that the lip 17 may depend integrally at an angle, as at 18, from the bearing surface 14 at an end of the body. It will also become apparent that, since the lip 17 is integral, the fibers 15 are also disposed uniformly throughout the lip 17 as well as the body of the bearing. This condition is carried out throughout the several modifications of the invention; whereby the plastic material is uniformly reinforced throughout the bearing 13 and integral lip structure at 17.

An important feature of this structure lies in its adaptability to be controlled. That is to say, the characteristics of the lip structure may be varied, so as to exercise control over the lip pressure against a rod or shaft operating through the bearing. This is important since the basic design may be employed either in non-pressurized bearing applications or in high or low fluid pressure devices. Thus, a wiping or scraping action, dry or lubricated will require certain properties and characteristics; whereas pressure application will demand an entirely different set of parameters. Control and variation may be achieved through alteration of one or more of: shape of lip, thickness of lip, length of lip from groove root, angle of lip, depth of groove, diameter of groove root, and specific composition and reinforcement of the plastic material.

Referring to FIG. 5, it will be seen that the bearing housing may be provided with two such bearings 13, so that an integral lip 17 is disposed at each end of the housing 35. Although these bearings 13 may be operated "dry" (without lubrication), a reservoir 39 may exist between the bodies of the bearings to serve as a lubricant reservoir in the event that a lubricated application is found preferable.

Figure 8:
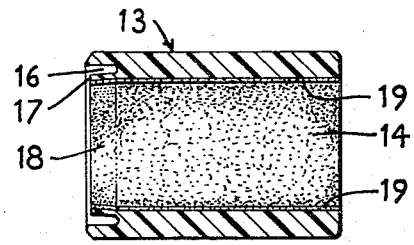
FIG. 8 is a longitudinal sectional view of the embodiment of FIG. 6, showing an additional feature of the invention.

A modification of the embodiment of FIGS. 5 and 6 is shown in FIG. 8. In this modification, the same bearing 13 with bearing surface 14, groove 16 and lip 17 is illustrated. The modifications consist in the addition of a film of plastic material for a reduced coefficient of friction. The film 19 is shown as being applied over the bearing surface 14 of the bearing. The material of the film 19 may be a solid coating selected from the group including the fluorocarbon high-polymers. However, the essential requirement of the film is only that it be non-readily removable from the bearing surface 14 during use of the bearing with a rod or shaft operating therethrough.

Figure 9:
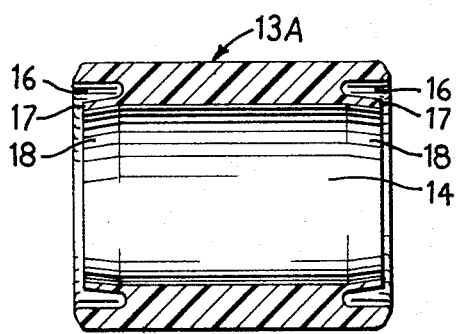
FIG. 9 is another view of the device of FIG. 6, but showing the structure of the invention at both ends of the device.

FIG. 9 illustrates a basic modification of the generic embodiment wherein a groove 16 is formed at each end of the cylindrical bearing 13A. An integral depending lip 17 is formed by each groove 16, thereby depending angularly from each end of the bearing body as at 18, with bearing surface 14 extending between the lips 17.

FIG. 1 illustrates another embodiment of the invention disposed in a fluid pressure operated cylinder 1 having a chamber 2 within, into which motive fluid pressure is adapted to enter through a suitable port 3 or the like. A piston rod 12 has a suitable bearing 13, as described above, and is disposed for reciprocation in an end of the cylinder 1 by the effect of the fluid pressure exerted on a piston (not shown) attached to the rod 12. The cylinder 1 is exemplary of many types such as hydraulic motors, shock absorbing mechanisms and the like.

An end member 4 forms the end of the cylinder 1 for enclosing the chamber 2; and is formed with an axial bore 7 having at the inner end a shoulder 6 formed within the piston stop (inner end of the end member 4). The piston rod 12 is disposed through the axial bore 7 of the end member 4. In order to properly maintain the piston rod within the cylinder with respect to coaxial support, means is provided in the form of an annular bearing 30 which is, in part, the subject matter of a modification of the invention.

The annular bearing 30 comprises a cylindrical body formed of plastic material as disclosed hereinabove, which may be molded or machined to the required shape. The material is also reinforced with unoriented fibers as disclosed hereinabove, to enhance the qualities of long wear, high strength and low flow properties. The inner surface 31 of the bearing 30 is formed to the diameter of the piston rod 12 forming a bearing surface therefor. In this case the piston rod is adapted to reciprocate through the bearing 30 in frictional engagement with the surface 31. However, it will be realized that this same structure is not necessarily limited to reciprocating motion.

Figure 3:
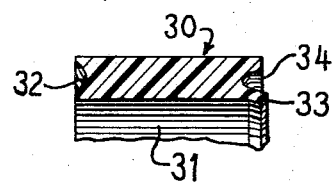
FIG. 3 is an enlarged fragmentary sectional view of another part of the embodiment of FIG. 1, showing the bearing and wiper.

Packing rings 5 are disposed separately in the end member 4 of the cylinder 1 and engage the piston rod 12 frictionally for sealing against the escape of fluid pressure from chamber 2. It will be seen that the packing rings herein shown are the V-type such as "Chevron" packings. However, U-cup or the like types may be used. In order to hold the packing rings 5, holding means is formed in the bearing 30 in the form of an annular groove 32 formed around one end of the bearing body. The groove 32 will be referred to hereinafter as a female adapter means, insofar as the packing rings 5 are in part received by the groove 32 and held thereby. FIG. 3 also illustrates this feature.

As an integral part of the bearing 30, wiping means in the form of a depending lip 33 is formed from one end of the cylindrical body of the bearing. A preferred means of forming the wiping means is to form a groove 34 in the end of the cylinder, forming the lip 33. Lip 33 may then be molded substantially as an incomplete truncated cone. That is to say, lip 33 has an angular relationship with the bearing surface 31 to thus depend inwardly of surface 31. With the piston rod disposed through bearing 30, the wiping means lip 33 engages the piston rod 12 frictionally. Since groove 34 is annular, depending lip 33 is likewise annular.

Throughout the specification, the term "rod" or "shaft" is not to be limited to any particular type of motion associated therewith, but is to apply by interpretation to any given application, such that a rod, shaft or valve stem may be used with any given bearing structure.

Figure 2:
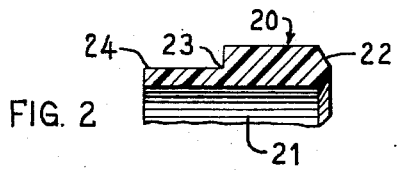
FIG. 2 is an enlarged fragmentary sectional view of a part of the embodiment of FIG. 1, showing a bearing adapter.

An adapter bearing 20 is provided, and may be optional, depending on the type of packing rings employed. The adapter bearing 20 comprises a cylindrical body formed of plastic material reinforced with unoriented fibers as discussed hereinabove, and having an annular pilot surface 24 for engaging the shouldered portion of end member 4. An O-ring 8 is disposed between shoulder 6 and shoulder 23, formed in the adapter bearing 20 for sealing against static pressure. The inner surface 21 of the adapter bearing 20 is formed to the diameter of the piston rod 12 for bearing thereagainst. Male adapter means 22 is formed in one end of the cylindrical body of the adapter bearing 20, as shown in FIG. 2, for holding the packing rings 5.

For the purposes of this invention, the bearing 30 is quite similar to the bearing 13 of FIG. 6, having the additional modification of the adapter means. The assembly of the piston rod bearing therefore comprises first the placement of the O-ring 8 against the shoulder 23 of the adapter bearing 20, which is then placed in the axial bore 7 of the end member 4 so that the O-ring 8 is disposed against the shoulder 6. The packing rings 5 are then disposed in bore 7 against the male adapter means 22 formed in the end of the cylindrical adapter bearing 20. The annular piston rod bearing 30 is then disposed in the bore 7 so that the female adapter means 32 bears against the packing rings 5. The depending lip 33 forming the wiping or scraping means of the annular bearing 30 is then in frictional engagement with piston rod 12.

The whole bearing device is held by means of any annular cap 9 at some shoulder 10 thereof abutting the end of bearing 30 to secure the same within the end member 4. The cap 9 may be held over the end of the cylinder 1 by any means such as threaded screws 11 or the like.

Figure 4:
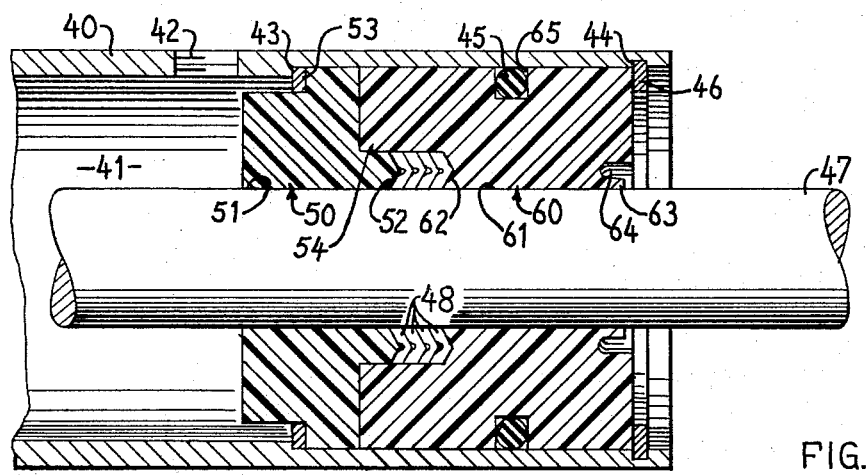
FIG. 4 is a longitudinal sectional view of a second embodiment of the invention disposed in an end of a fluid operated cylinder.

Yet another modification of the invention is illustrated in FIG. 4. A cylinder 40 defining a chamber 41 therein adapted to receive fluid pressure through port 42 is exemplary of the cylinder described for FIG. 1. The cylinder 40 may also be described broadly as any bearing housing such as may exist in the form of a shaft log or the like. While this structure may be operated as a fluid pressure cylinder, the basic problem is to use a cartridge or insert type bearing forming also an end member for sealing the chamber 41 against the escape of fluid pressure or the like. To this end there is provided in the end of the cylinder 40 a shoulder 43 acting as a stop against which the cartridge type end insert is to be disposed.

The insert type bearing 60 disposed in the end of the cylinder 40 of this modification comprises a cylindrical body of a diameter substantially equal to the inside diameter of the cylinder 40 as defined by chamber 41. Any annular groove 65 may be provided into which is placed an O-ring 45 or the like for sealing against static pressure around the bearing body. The body of the bearing 60 is formed of plastic material reinforced with unoriented glass fibers as discussed hereinabove. An axial bore 61 is formed through the bearing 60, forming a bearing surface against which the rod 47 is adapted to frictionally engage for rotation, oscillation or reciprocation. A depending lip 63 is formed in an end of the body depending from the bearing surface 61 forming integral wiping or scraping means, similarly to the annular lip 17 of bearing 13. An annular groove 64 may be formed in the end of the bearing 60, thus forming the lip 63.

Female adapter means 62 is provided as an annular groove or recess in an end of the bearing 60, forming also a pilot surface for the packing rings 48.

An adapter bearing 50 is provided comprising a cylindrical body through which is formed an axial bore 51 forming a bearing surface against which the piston rod 47 is adapted to operate. A flange 54 forms a pilot surface for engaging the adapter means 62 of the bearing 60, and has formed on the end thereof male adapter means 52 for the packing rings 48. A shoulder in the outer surface of the adapter bearing 50 has disposed therearound a washer 53 which also bears against the shoulder 43 in the cylinder. A retaining ring 46 of conventional type is disposed in a groove 44 therefor formed in the end of the cylinder 40. It will be seen that the bearing 60, packing rings 48 and adapter bearing 50 are secured in the end of the cylinder 40 by means of washer 53 and the retaining ring 46. It will be appreciated that ring 46 is only one of any conventional retaining device which may be used. The body of the bearing 50 is formed of plastic material reinforced with unoriented fibers as discussed hereinabove.

Figure 7:
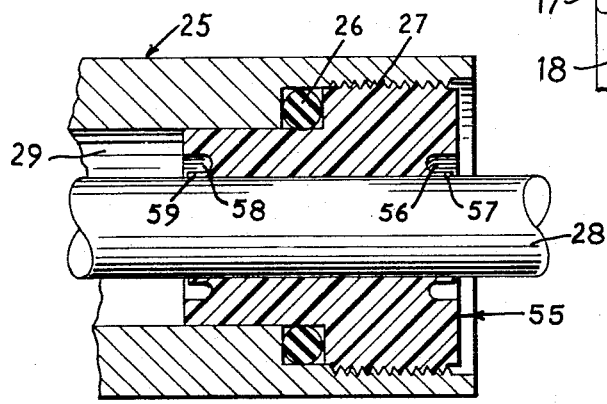
FIG. 7 is a longitudinal section view of still another modification disposed in an end of a fluid operated cylinder, etc.

In the case where the embodiment of FIG. 4 is employed, as well as the about to be described embodiment of FIG. 7, maintenance and service are reduced almost to the level of the operator of the device using the invention. The whole assembly of the inserted bearings 50 and 60 and packing means 48, or bearing 55 may be replaced, if necessary, by the operator of the device, thus reducing the level of engineering skill required for service.

In FIG. 7, another bearing housing 25 is illustrated which may be in the form of a cylinder or the like as in FIG. 4. Again, it is necessary to form the bearing 55 of this embodiment as an insert for the end of the housing 25. To this end a static pressure seal may be provided if necessary in the form of an O-ring 26 or the like. The bearing 55 comprises a cylindrical body formed of plastic material reinforced with unoriented fibers. This material is the same as used for the previously described embodiments. A threaded portion 27 may be provided for mating to a corresponding threaded portion of the bearing housing 25. However, the retaining ring as at 46, FIG. 4, may be substituted for the threaded portion 27.

Integral wiping or scraping means may be provided in the form of a lip 57 depending from an end of the bearing body from the bearing surface which is formed by an axial bore through the bearing body. An annular groove 56 formed in the same end of the bearing body thus forms the lip 57. Lip 57 is the same as lip 17 in FIG. 6. A rod 28 is disposed through the bearing bore of bearing 55 to the chamber 29 within the bearing housing 25. It will be seen that the bearing surface and the lip 57 of the bearing 55 are in frictional engagement with the rod 28 as in the other embodiments.

Integral seal means may also be formed from an end of the body of bearing 55 opposite the end having the wiping means. The seal means is in the form of an integral depending lip 59 formed from the end of the body adjacent the bearing surface therethrough. A groove 58 forms an annulus from which the lip 59 is formed.

Figure 10:
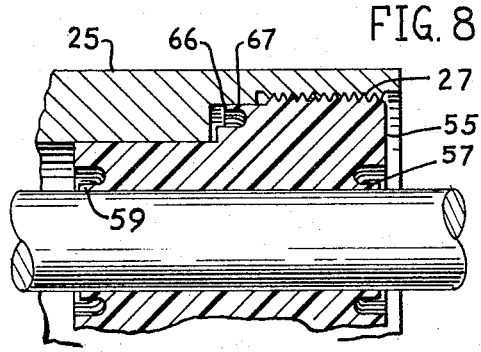
FIG. 10 is a fragmentary longitudinal sectional view of an embodiment similar to that of FIG. 7, showing another feature.

FIG. 10 illustrates the bearing housing 25 and the bearing 55 as in FIG. 7. As in FIG. 7, the integral wiping or scraping means lip 57 and the integral seal means lip 59 are formed in the body of the bearing 55. The plastic material described hereinabove is also used in this embodiment. However, in place of an O-ring, static pressure seal means is provided as an integral part of the bearing 55. An annular groove 66 is formed around a shoulder of the bearing body, and an integral lip 67 is thus formed by the groove 66 to depend integrally from the shoulder of the bearing body. The lip 67 engages the housing 25, forming a static seal against the escape of fluid pressure around the bearing 55. It will be realized that this modification provides for a complete end member device having its own static pressure seal, wiping or scraping means and rod or shaft seal means.

The embodiments of FIG. 4, 7 and 10 are not restricted, however, to cylinders; but find applications as contemplated for replacement of conventional sleeve bushings and the like for all reciprocal, rotating and oscillating parts such as push rods, drive shafts, valve stems and the like. Such conventional bushings may be in the form of bronze or case hardened steel sleeve inserts which were press fitted in place. Replacement of such conventional parts is expensive, due to the labor involved; whereas the bearings according to this invention are often serviceable by operators of equipment and do not always require expert mechanics or the like.

In the embodiment of FIG. 1, the assembly of bearings is also adapted for replacement of conventional structure which may be similarly disposed in a bearing housing.

Any of the embodiments of the bearing may be formed such that the end of the body of the bearing extends axially beyond the end of the depending lip formed at that end of the body. That is to say, a lip may be formed such that it does not extend axially to the end of the bearing body. Thus, during installation of a bearing, the possibility of damage being done to the lip is minimized since the lip is not exposed to tools and the like.

The operation of this invention is basically the same for all embodiments disclosed. As the rod rotates, oscillates or reciprocates in the bearing 13 in FIG. 5, dirt which may have accumulated on the surface of the rod 37 outside the bearing 13 would normally be carried into the bearing area or journal area. The depending lip 17 engages the rod 37 frictionally, forming a wiper or scraper which seals against the entry of the dirt and foreign matter.

As the dirt is scraped from the rod 37, the dirt is deposited in the annular groove 16. It will be understood that, on construction machinery where the rod 37 may be a clevis pin and the housing 35 would be moving as in a backhoe or the like, this feature is of paramount importance incident to long bearing life.

In any modification of the invention, should any foreign matter at any time become disposed in the journal area of the rod between the rod and its associated bearing, the plastic material has an extremely important property. The embeddability of the plastic material enables the bearing to encapsulate some foreign particles, thus preventing scoring of the rod journal.

Also in FIG. 5, should a lubricated application be required, the reservoir at 39 caused by the space between the two bearings 13 permits the accumulation of lubricant necessary, and would also serve as a lubricant entry area for pressure lubrication application.

In the embodiments in FIGS. 1 and 4, the lips 33 and 63 of bearings 30 and 60 respectively operate in the same manner as described hereinabove. The separate packing rings perform a dynamic seal function against the escape of any fluid pressure present within chamber 2 or 41 respectively.

The embodiment of FIG. 7 operates similarly to that in FIG. 4. Lip 57 and groove 56 function as the wiper or scraper to remove foreign particles from the journal of the rod 28. A second integral means in the form of depending lip 59, formed by annular groove 58, acts as a lip seal or otherwise as a dynamic seal against the escape of fluid pressure which may be present in the chamber 29.

It will be observed that the reinforcement in all of the embodiments is uniform throughout the plastic material, wherein the unoriented fibers are therefore present not only in the body of any bearing, but also in the depending integral lips formed from the bearing bodies.

The reinforced plastic material provides bearing life fully three times the life of conventional bronze units of like configuration, and coefficient of thermal expansion of the plastic of this invention is equal to that of cast iron, therefore being less than that of steel or bronze as used in bearings. This allows one to produce a plastic bearing to closer tolerances, where required for greater bearing efficiency due to more consistent size.

It is therefore obvious that the objects of the invention are carried out in a device which is adapted for many modifications useful in rotary, oscillating and reciprocating applications, and wherein the bearing so produced is easier to service and maintain and is adapted for extremely long life under a wide range of conditions, whether ambient or operating.

Although specific embodiments of the invention have been shown and described for the purposes of illustration, it is to be understood that the invention is to be construed according to the spirit and scope of the appended claims.

I claim:

1. In a cylinder having a piston rod bearing comprising a cylindrical body disposed in one end of the cylinder, said body having formed therein an axial bore forming a bearing surface through which the piston rod is adapted to reciprocate, and integral wiping means comprising an integral lip depending from said body at one end of said bore, said lip being disposed in frictional engagement with said piston rod, integral adapter means comprising a groove formed around an end of said body adjacent said bore, and packing means held by said adapter means in engagement with the piston rod.

2. In a cylinder having a piston rod, a piston rod bearing comprising a cylindrical body disposed in one end of the cylinder, said body forming an end member of said cylinder, said body having formed therein an axial bore forming a bearing surface through which the piston rod is adapted to operate, wiping means comprising a depending lip formed from said body at one end of said bore, said lip being disposed in frictional engagement with said piston rod; an adapter bearing comprising a second cylindrical body disposed in the end of the cylinder in axial alignment with said first body, adapter means formed in each said body; packing means held by said adapter means in engagement with the piston rod; a seal disposed between the cylinder and one of said bodies.

References Cited

UNITED STATES PATENTS

| | | | |
|---|---|---|---|
| 431,293 | 7/1890 | Sullivan | 277—19 |
| 1,035,083 | 8/1912 | Cock | 308—3.5 |
| 2,356,027 | 8/1944 | Boyd | 308—36.1 |
| 2,428,411 | 10/1947 | Davis | 308—36.1 |
| 2,639,198 | 5/1953 | Kirkham | 308—3.5 |
| 2,809,130 | 10/1957 | Rappaport. | |
| 3,056,709 | 10/1962 | Rising. | |
| 3,038,347 | 6/1962 | Sloan | 277—212 X |
| 3,067,135 | 12/1962 | Strub. | |
| 3,113,806 | 12/1963 | Cripl | 308—3.5 |

FOREIGN PATENTS

| | | |
|---|---|---|
| 1,077,407 | 11/1954 | France. |
| 1,121,737 | 8/1956 | France. |
| 821,692 | 10/1959 | Great Britain. |

MARTIN P. SCHWADRON, *Primary Examiner.*

DON A. WAITE, DAVID J. WILLIAMOWSKY, *Examiners.*

L. L. JOHNSON, *Assistant Examiner.*